(12) United States Patent
Barbagelata et al.

(10) Patent No.: US 6,979,788 B1
(45) Date of Patent: Dec. 27, 2005

(54) ELECTRICAL SWITCH SYSTEM RESPONSIVE TO GEAR SELECTION OF VEHICULAR TRANSMISSION

(75) Inventors: Melissa M. Barbagelata, Newton, MA (US); Andrew K. Houbre, New Bedford, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/926,726

(22) Filed: Aug. 26, 2004

(51) Int. Cl.$^7$ .............................................. H01H 9/06
(52) U.S. Cl. ................................................. 200/61.88
(58) Field of Search .................... 200/61.88, 61.89, 200/61.91, 11 A, 11 R, 11 TW, 11 G, 11 J, 200/11 K, 14, 83 N, 83 P

(56) References Cited

U.S. PATENT DOCUMENTS

| | | | |
|---|---|---|---|
| 5,525,768 A * | 6/1996 | Cobb, III et al. | 200/61.88 |
| 5,736,701 A | 4/1998 | O'Brien et al. | |
| 5,828,022 A * | 10/1998 | Nakazawa et al. | 200/61.88 |
| 5,828,023 A * | 10/1998 | Nakazawa | 200/61.88 |
| 5,969,313 A * | 10/1999 | Ikeshima et al. | 200/61.88 |
| 5,977,496 A * | 11/1999 | Halberg et al. | 200/61.88 |
| 6,096,988 A * | 8/2000 | Tsukamoto et al. | 200/61.88 |
| 6,897,386 B2 * | 5/2005 | Nakazawa et al. | 200/61.88 |

* cited by examiner

*Primary Examiner*—Elvin G Enad
*Assistant Examiner*—M. Fishman
(74) *Attorney, Agent, or Firm*—Russell E. Baumann; Frederick J. Telecky, Jr.

(57) ABSTRACT

An electrical switch system (10) for use with a motor vehicle transmission has a movable contact assembly (16) mounted on an insulative base member (14) in turn mounted on a detent lever (22). The detent lever (22) is mounted on a manual shaft (20) for pivotal movement therewith while a housing is rotatably mounted on the manual shaft facing the detent lever. A plurality of side-by-side arcuate contact strips are insert molded in the housing wall with contact segments (1–6) exposed on a wall facing the movable contact assembly. The housing is maintained in one fixed angular position while movable contacts sweep across the contact segments upon pivotal motion of the manual shaft. A control gap is provided by ledges (12k) formed in the housing with a lip (14b) of the insulative base member (14) mounting the movable contact assembly received in the control gap to ensure that appropriate contact engagement between the movable contact assembly and control segments is maintained. In a modified embodiment an additional lip (14b') and corresponding housing ledge (12k') is provided at an opposite side of the insulative base member.

15 Claims, 7 Drawing Sheets

ELECTRICAL SWITCH SYSTEM RESPONSIVE TO GEAR SELECTION OF VEHICULAR TRANSMISSION

FIELD OF THE INVENTION

This invention relates generally to vehicular transmissions and more particularly to an electrical switch system for providing a continuous signal to the transmission controller indicative of the position of the transmission.

BACKGROUND OF THE INVENTION

In past years it was common to mount a rotary switch on a transmission housing externally thereof to receive mechanical gear selection inputs from the operator of a vehicle through various linkages and output gear selections to appropriate output means such as a decoder module and the transmission electronic control unit via electronic signals. The switch includes a quadrant with a selected number of electrical switch segments disposed thereon with each segment providing an output to the output means. A manual valve controlling hydraulic operation of the transmission is mechanically coupled to a plate having indexing detents, called a detent lever, mounted on a shaft and pivotably movable therewith. The shaft extends through the transmission housing wall and a switch bar is fixedly attached to the shaft externally of the transmission housing so that when a vehicle operator selects a gear the switch bar within the rotary switch moves across the quadrant to a predetermined position to engage one or more of the electrical segments. In certain systems the electronic control monitors the gear position along with other inputs, for example, throttle position, output shaft speed, engine speed, engine load and so on.

In U.S. Pat. No. 5,736,701, assigned to the assignee of the present invention, a switch system is disclosed which is mounted within the transmission housing in order to avoid placing the switches in a hostile environment subject to water splash and the like as well as to avoid tolerance stack-up problems associated with linkages employed when mounting the switches externally of the transmission housing.

In the referenced patent, a movable electrically conductive contact assembly is mounted directly on a first face surface of the detent lever of the manual valve assembly. A generally flat quadrant shaped housing member, formed of electrically insulative material, is rotatably mounted on the manual shaft in a position adjacent to and overlying the detent lever. A stationary, electrically conductive contact assembly is disposed on a face of the housing member overlying the first face surface of the detent lever. A plurality of generally L-shaped attachment projections, extending from the outer periphery of the housing member, have legs spaced from the face of the housing member extending toward the manual shaft receiving bore so that the legs extend over at least a portion of the opposite, second face surface of the detent lever. A generally L-shaped locking projection, extending from the housing, is received through a cut-out portion of the detent lever when the attachment projections are out of alignment with the detent lever. Following insertion of the locking projection through the cut-out portion, rotation of the housing relative to the detent lever causes a leg of the locking projection to move over at least a portion of the second face surface of the detent lever when the attachment projections are aligned with the detent lever. The housing member is provided with a pair of prongs which receive therebetween the roller of a roller/spring assembly to thereby maintain the housing member in a selected X-Y position. The distance between the legs of the attachment and locking projections from the face surface of the housing member determines the position of the housing member in the Z direction in cooperation with a spring bias provided by the movable contact assembly. The stationary contact assembly has a plurality of arc-shaped contact segments separated from one another in a radial direction by rib members which extend from the surface of the housing a selected distance beyond the contact segments to thereby prevent short circuiting between adjacent contact segments by debris or the like.

Switch systems made in accordance with the '701 patent are very effective in obviating the prior art hostile environment and stack-up problems; however, in the transmission of certain vehicles the space available to place a switch system within the transmission housing, particularly in the direction taken along the longitudinal axis of the manual shaft, i.e., in a vertical or Z direction, is insufficient for housing structure of the switch system to extend beyond the second face surface of the detent lever in the vicinity of the arcuate stationary contacts, that is, L-shaped attachment projection 24a and leg 24d of the patent. The legs of attachment projections 24a, 24b, 24c and locking projection 24g are used to maintain an appropriate gap, that is, they are used in determining the position of the stationary contact assembly relative to the detent lever and, concomitantly, movable contact elements mounted on the detent lever for electrical engagement with respective stationary contacts. Leg 24d of abutment 24a supports the movable contact assembly the most during the index positions of DRIVE and LOW. In order to operate as intended, it is imperative that continuous engagement be maintained between the movable electrical contacts on the detent lever with the stationary electrical contact assembly.

The problem of ensuring this maintenance of engagement is exacerbated by the fact that the switch system housing, molded of electrically insulative material, typically is subject to some degree of warpage.

SUMMARY OF THE INVENTION

It is an object of the present invention to provide a switch system which overcomes the limitations of the prior art noted above. Another object of the invention is the provision of a switch system particularly useful with motor vehicle transmissions having a housing that overlies one face surface of the detent lever but does not extend beyond the opposite face surface of the detent lever in the vicinity of the movable contact assembly when in the DRIVE and LOW index positions. Yet another object of the invention is the provision of a switch system used with vehicular transmissions for providing an indication of transmission operation which is of low cost, robust, reliable and relatively insensitive to vibration.

Other objects, advantages and details of the switch system appear in the following detailed description of preferred embodiments of the invention.

Briefly in accordance with the invention, a movable contact assembly is mounted on an electrically insulative base member which in turn is mounted on a face surface of the manual shaft mounted detent lever of a vehicular transmission. A generally plate-like housing member is mounted on the manual shaft for pivotable motion relative to the manual shaft and detent lever. A stationary contact assembly in the form of a lead frame is insert molded in the housing with a plurality of side-by-side arcuate shaped electrical contact segments exposed on a face surface of the housing facing the movable contact assembly. The housing is formed with a side wall having an elongated ledge extending in a radial direction which forms a control gap between the ledge and the face surface of the housing having the exposed contact segments of the stationary contact assembly in which an arcuately extending lip of the insulative base member is received. In one embodiment, the lip is formed along the side of the insulative base member furthest from and facing away from the manual shaft and in a modified embodiment the lip is formed along both the side of the insulative base member closest to as well as furthest from, the manual shaft.

The housing is formed with a pair of spaced apart prongs between which the roller of a roller/spring assembly is used to maintain the housing in a selected x-y position as the detent lever and manual shaft pivot with changes of transmission position. The spacing between the movable contact assembly mounted on the insulative base member and the face surface of the housing on which the arcuate segments are exposed is closely controlled by the lip(s) of the insulative base member received in the control gap to thereby ensure continuous engagement of the movable contact assembly with the stationary contact assembly.

BRIEF DESCRIPTION OF THE DRAWINGS

Other objects and features of the invention will become apparent by reference to the following detailed description of preferred embodiments when considered in connection with the accompanying drawings wherein.

DETAILED DESCRIPTION OF PREFERRED EMBODIMENTS

Figure 1:
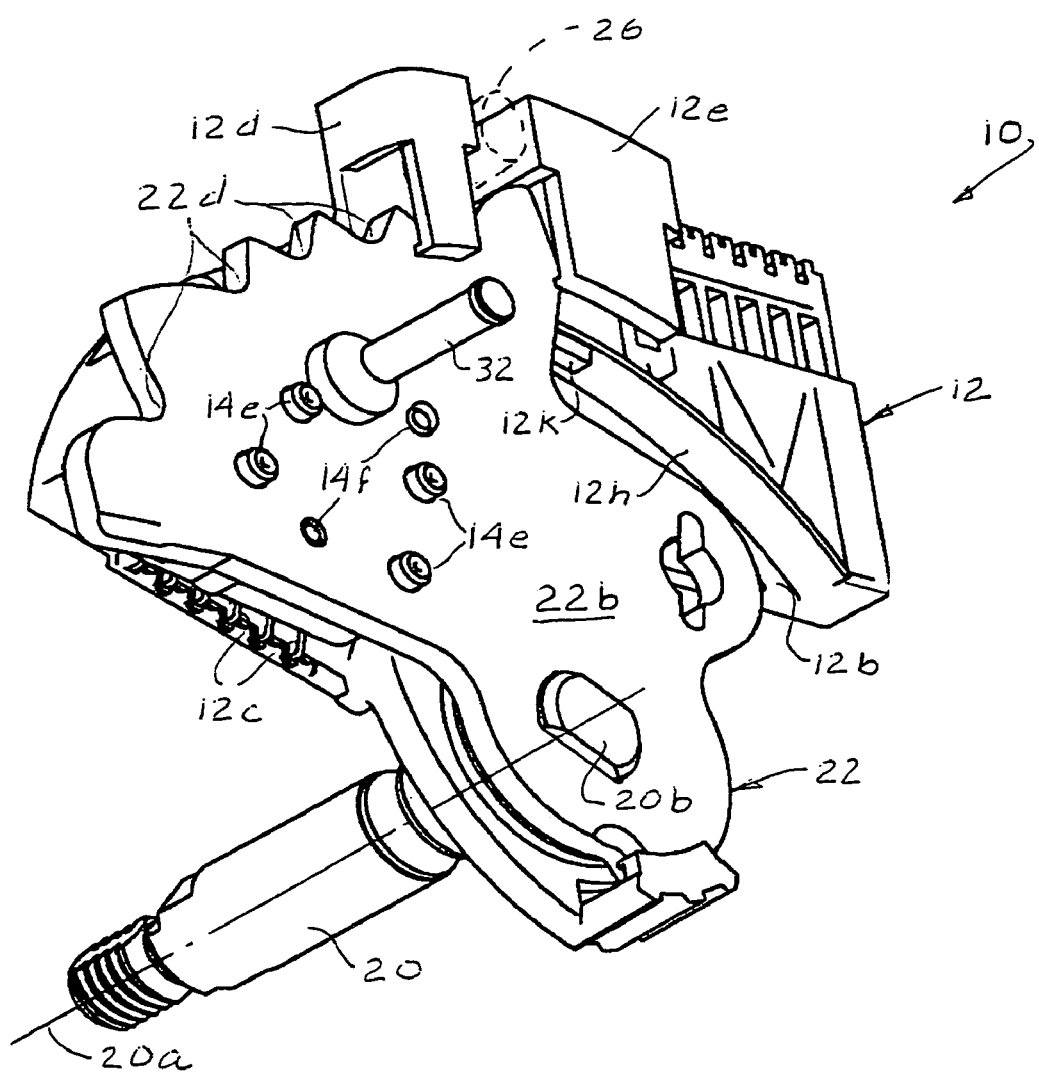
FIG. 1 is a perspective view of a switch system made in accordance with a preferred embodiment of the invention.
Figure 2:
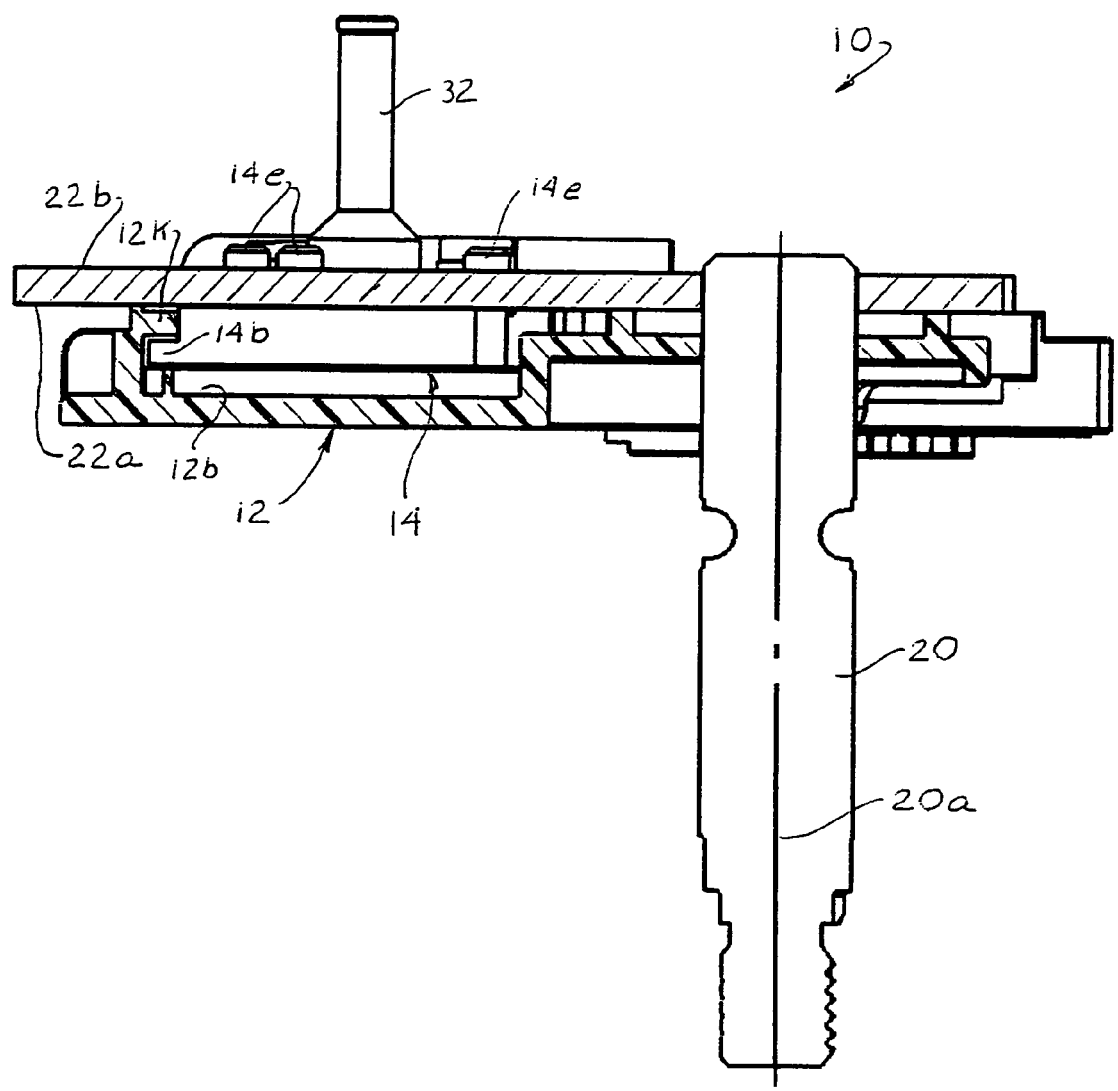
FIG. 2 is an elevational cross section of the system, with some switch structure omitted for purposes of illustration.

With reference to FIGS. 1–5, an electrical switch system 10 made in accordance with a preferred embodiment of the invention includes a housing 12 mounting a stationary contact assembly comprising a plurality of stationary contact segments 12a (FIG. 5) mounted on a manual shaft 20 for pivotable movement, relative to shaft 20, about longitudinal axis 20a of the shaft. Also mounted on manual shaft 20 is a detent lever 22 which is fixedly mounted on the shaft for pivotable motion with shaft 20 about longitudinal axis 20a. Detent lever 22 has opposed first and second generally planar face surfaces 22a, 22b with face surface 22a facing inner surface 12b of housing 12. An insulative base member 14 is fixedly attached to face surface 22a of detent lever 22. A movable contact assembly 16 is mounted on an outer surface 14a of base member 14 facing inner surface 12b of housing 12.

Detent lever 22 is fixed to manual shaft 20 so that detent lever 22 pivots along with the manual shaft while housing 12 is maintained at a pre-selected angular position by means of a roller member 26 (shown in dashed lines in FIG. 1) of a transmission roller/spring assembly received between spaced apart prongs 12d, 12e of housing 12 in a conventional manner. This pivotal motion of shaft 20 causes detent lever 22 to pivot with movable contact assembly 16 moving into and out of electrical engagement with various stationary contact segments 12a in dependence on the angular position of shaft 20.

Detent lever 22 is formed with a plurality of detents 22d formed in the outer peripheral edge extending radially inwardly and receiving coupling roller member 26 of the transmission roller/spring assembly. Each detent corresponds to a respective position of the manual valve and consequently to a respective gear of the transmission. Also shown in FIG. 1 is a pin 32 used as a manual link to connect the detent lever to the transmission manual valve.

Figure 5:
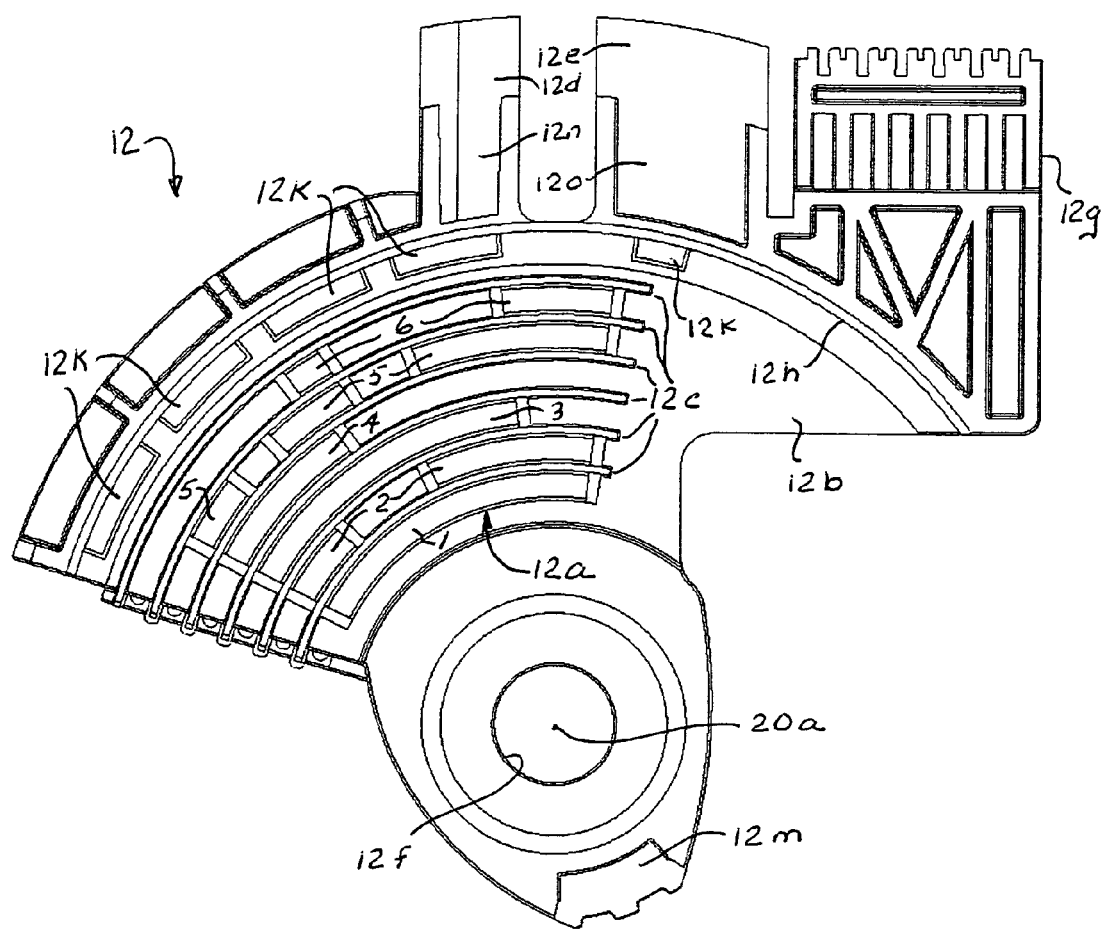
FIG. 5 is a top plan view of the FIG. 1 housing.

More specifically, with particular reference to FIG. 5, housing 12 comprises an electrically conductive lead frame insert molded in non-conductive resinous material. The lead frame includes side-by-side spaced apart arcuate strips each having a radius of curvature with longitudinal axis 20a as the respective center of curvature. Although the number of contact strips is a matter of choice, six strips, 1–6 respectively, are provided in the preferred embodiment shown with each contact strip having one or more arcuate contact segments exposed on inner face surface 12b of the housing and identified in the drawings by the contact strip characters, i.e., characters 1–6. Preferably, and as shown in FIG. 5, arcuate ribs 12c, extending above the general plane of inner face 12b, are formed along the length of and between each contact strip to prevent the possibility of short circuiting caused by conductive debris. Housing 12 is formed with a manual shaft receiving circular bore 12f forming a suitable rotatable connection with the manual shaft. Housing 12 has a connector portion 12g for providing electrical connection with the contact strips. An arcuate wall 12h extends upwardly from inner face surface 12b adjacent the outer periphery of the housing. A series of arcuately extending ledges 12k project radially inwardly from wall 12h toward longitudinal axis 20a and are spaced a selected distance from inner face surface 12b forming a control gap for a purpose to be discussed below. Over travel stop leg 12m is shown with a portion, spaced above and extending over a portion of face surface 22b diametrically opposite to the contact segments 12a, and prongs 12d, 12e are shown having respective attachment legs 12n, 12o extending therefrom spaced above and extending over a portion of face surface 22b of the detent lever. It will be understood that these portions extending over a portion of face surface 22b may be used, if desired, assuming there is sufficient room for this structure. Alternatively, the structural portions extending over face surface 22b can be eliminated, as shown in the FIGS. 6 and 7 modified embodiment, to be discussed.

Figure 3:
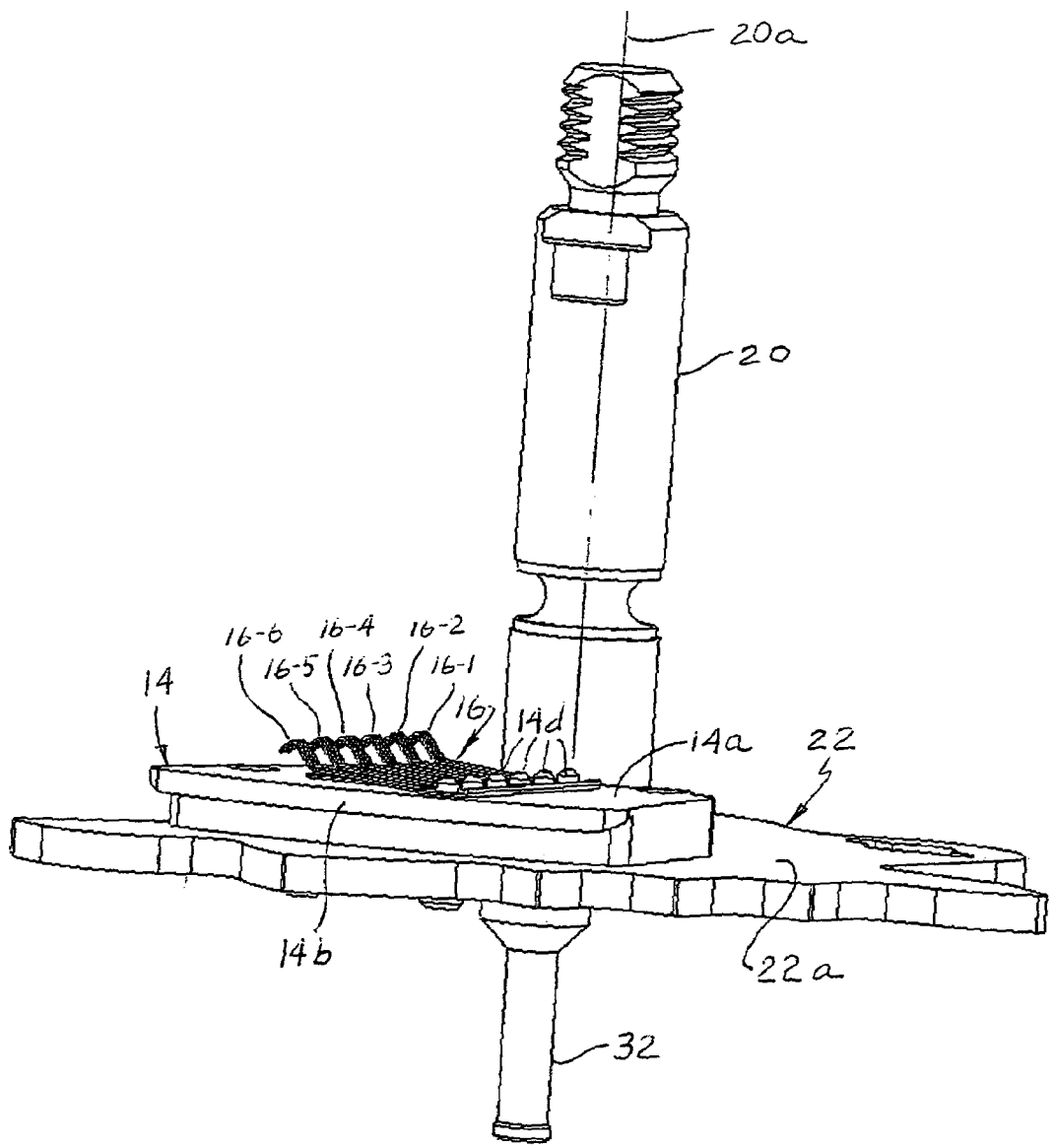
FIG. 3 is a perspective view of a manual shaft, detent lever, insulative base member and movable contact assembly of the FIG. 1 embodiment but in an inverted orientation relative thereto.

FIG. 3 shows insulative base member 14 mounted on first face surface 22a of detent lever 22. Insulative base member 14 is a generally plate like member formed of suitable electrically insulative material with an arcuate, laterally extending lip 14b disposed a selected distance from first face surface 22a projecting radially away from longitudinal axis 20a.

Movable contact assembly 16 comprises an electrically conductive leaf spring having cantilever spring arms 16-1 to 16-6 respectively, extending from a base strip 16a mounted on the outer surface 14a of the insulative base member. The leaf spring is formed of electrically conductive spring material and is formed with a row of apertures in strip 16a for receiving respective knobs 14d of a row projecting above surface 14a and subsequent staking to fix the movable contact assembly to base member 14. The row of knobs form a line which coincides with a radial line drawn from longitudinal axis 20a and spring arms 16-1 to 16-6 are spaced from one another to be in alignment with a respective contact strip 1–6.

Figure 4:
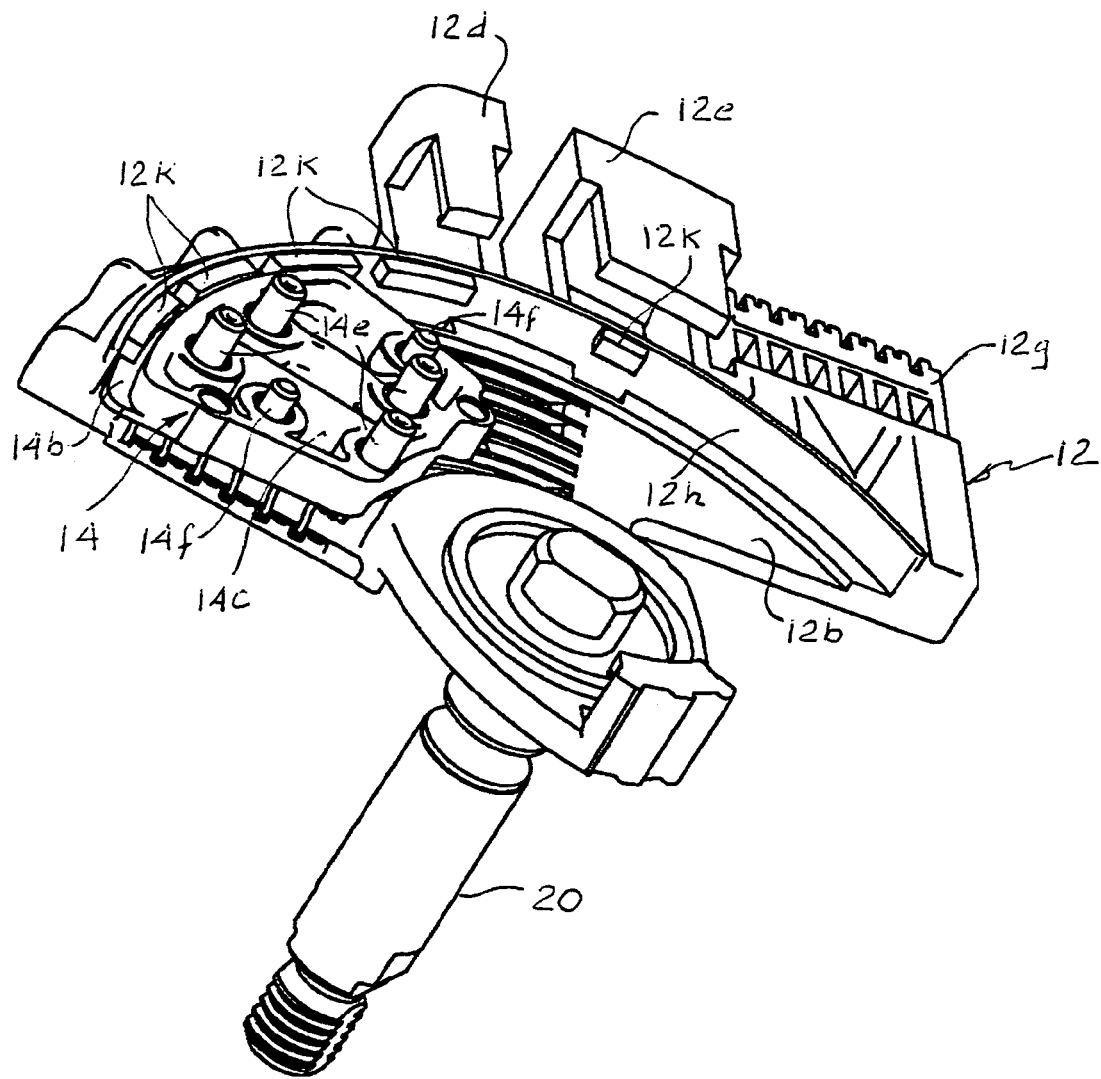
FIG. 4 is a perspective view of the manual shaft, housing and insulative base member of the FIG. 1 embodiment and generally in the FIG. 1 orientation.

As shown in FIG. 4, side 14c of insulative base member 14, opposite to side 14a, is provided with a plurality of attachment pins 14e and guide pins 14f which are received in mating holes in detent lever 22 not shown in the figure.

The attachment pins are staked over for attachment of insulative base member 14 to the detent lever.

As seen in FIG. 3, cantilever spring contact arms 16-1 to 16-6 have free end portions spaced from surface 14a of the insulative base member and, when the system is assembled, are biased against the arcuate tracks on inner face surface 12b in which contact segments 1–6 are disposed. In order to ensure that the appropriate gap is maintained between inner face surface 12b and outer surface 14a of insulative base member 14 and thus appropriate contact engagement between the free end portion of arms 16-1 to 16-6 with respective contact segments 1–6, lip 14b is received in the control gap formed between ledge 12k and inner face surface 12b so that the appropriate gap is maintained at all the operational angular positions of the manual shaft and the detent lever.

Figure 6:
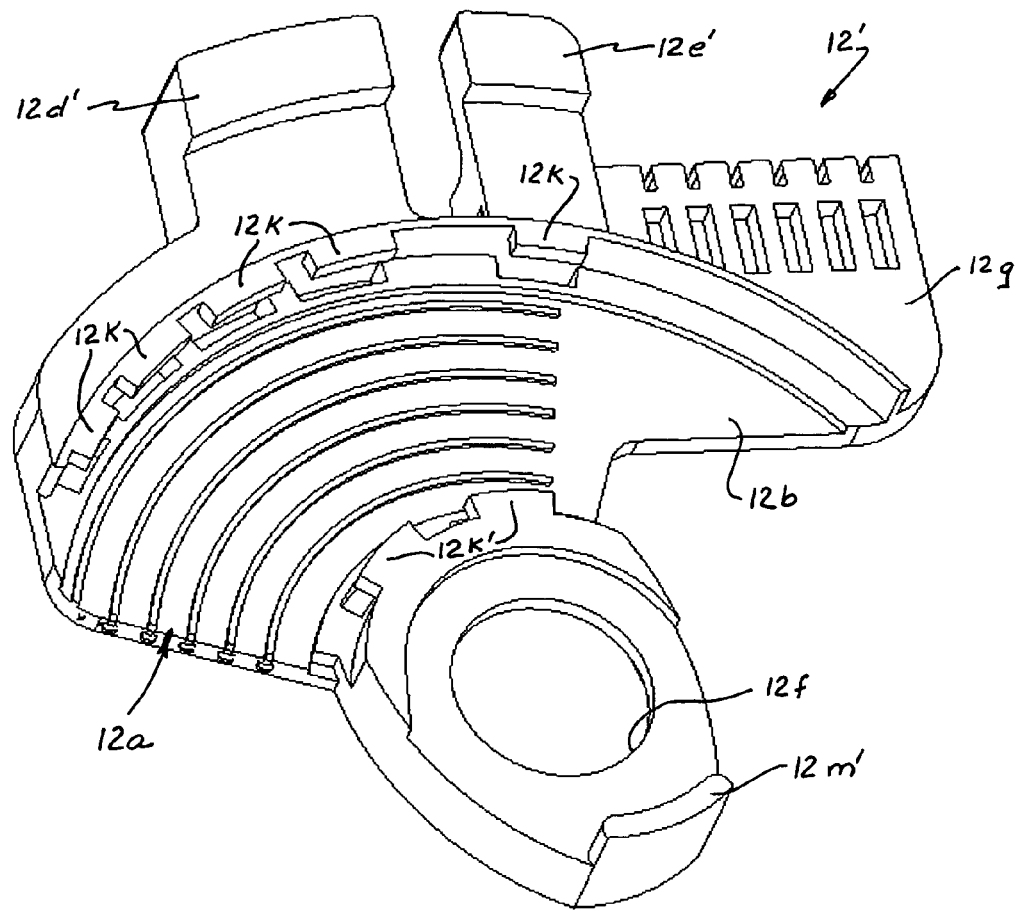
FIG. 6 is a perspective view of a modified housing.
Figure 7:
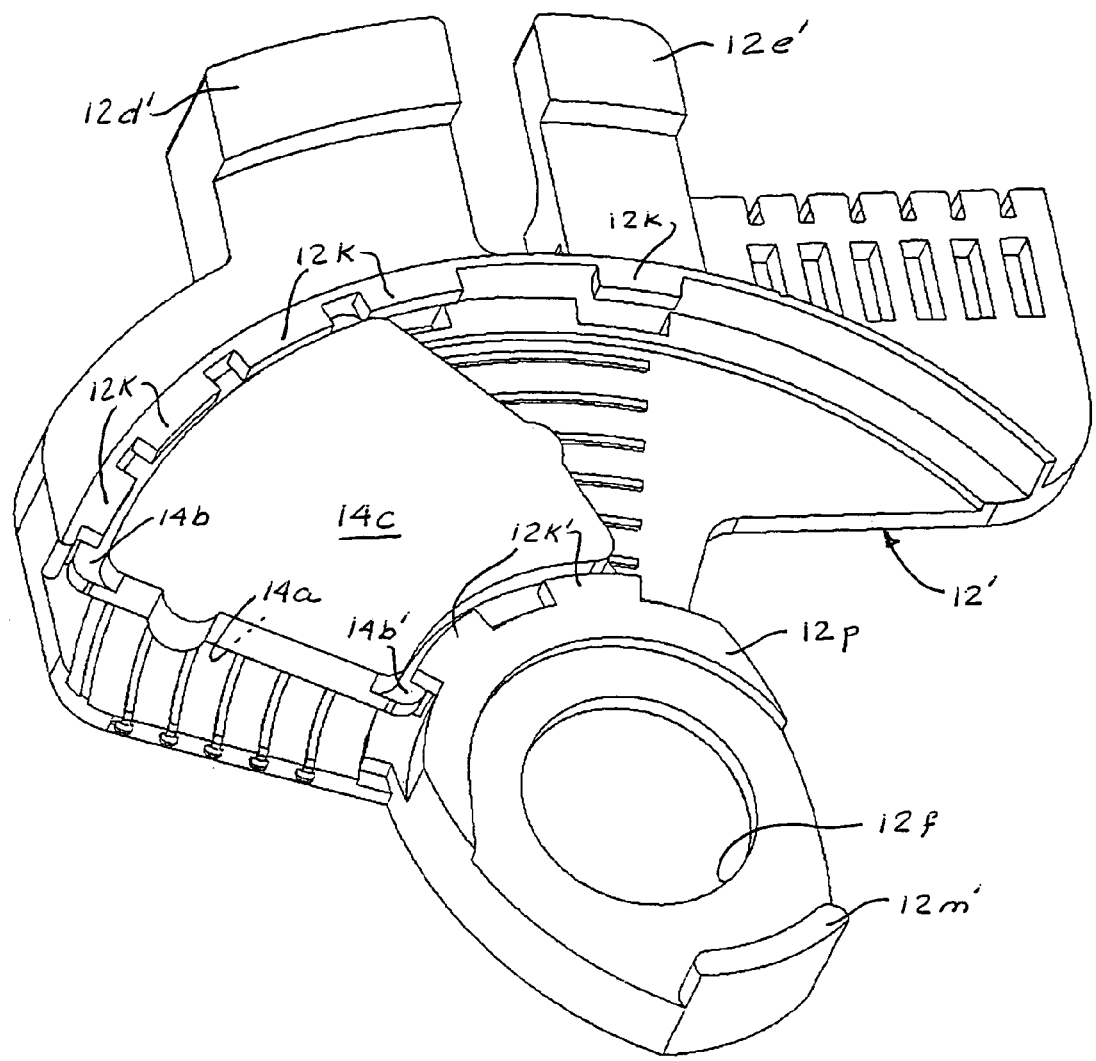
FIG. 7 is a perspective view similar to FIG. 6 but including a modified insulative base member, shown without attachment pins and guide pins for purposes of illustration.

FIGS. 6 and 7 show a modification of the preferred embodiment of FIGS. 1–5 in which an additional ledge 12k' is formed on hub 12p of housing 12' projecting radially outwardly relative to bore 12f which forms a control gap between inner face 12b and ledge 12k'. Insulative base member 14' is formed with an additional lip 14b' which extends from outer surface 14a in a direction radially inwardly toward bore 12f. Thus, lips 14b and 14b' are both received in control gaps providing even greater assurance of consistent contact engagement being maintained with the stationary contact assembly by all the cantilever contact arms in all operational angular positions.

As mentioned above, the FIGS. 6 and 7 modified embodiment also includes prongs 12d', 12e' and leg 12m' which are formed without any structure extending over the opposite face surface 22b of the detent lever. In other respects the switch system incorporating the double lip operates in the same manner as in the FIGS. 1–5 embodiment. Ledges 12k, 12k' are shown as being discontinuous for the purpose of convenience in constructing the device, however, it is within the purview of the invention to make the ledges continuous if desired. Further, it will be understood that ledge 12k' on hub 12p and lip 14b' closest to the manual shaft can also be used without ledge 12k and lip 14b furthest from the manual shaft, if desired.

It will be apparent to those skilled in the art that variations of the structure described can be made to accomplish the same purpose. All such variations within the scope of the claims are intended to be within the scope and spirit of the present invention.

What is claimed is:

1. An electrical switch system for use with a vehicular transmission having a manual shaft pivotable about a longitudinal axis of the manual shaft and a detent lever fixedly mounted on the manual shaft for pivotable movement with the manual shaft, the detent lever having opposed first and second generally planar face surfaces comprising:

an insulative base member mounted on the first face surface, the insulative base member having a top surface and a lip spaced from the first face surface of the detent lever and extending in an outwardly, radial direction relative to the manual shaft, a plurality of movable electrical contact elements mounted on the top surface of the insulative base member, a housing member having an outer periphery mounted on the manual shaft and being pivotable relative to the manual shaft about the longitudinal axis, the housing member overlying the detent lever and having an inner surface facing the first face surface of the detent lever, a plurality of side-by-side stationary electrically conductive electrical contact segments disposed on the inner surface of the housing member and being alignable with respective movable electrical contact elements, the housing formed with a ledge having a free end portion along the outer periphery thereof spaced from the inner surface and extending in a radial direction inwardly toward the manual shaft, the free end portion of the ledge received between the lip of the insulative base member and the first face surface of the detent lever, and a coupling member extending from the vehicular transmission to the housing to maintain the housing at a pre-selected angular position regardless of pivotable movement of the manual shaft and detent lever, whereby the spacing between the contact segments on the inner surface of the housing member and the movable contact elements on the top surface of the insulative base member is limited by the lip and ledge arrangement throughout an operational range of pivotal movement of the manual shaft and detent lever.

2. An electrical switch system according to claim 1 in which the contact segments are generally arcuate in shape having a center of curvature essentially coincident with the longitudinal axis.

3. An electrical switch system according to claim 2 further comprising a rib extending from the inside face of the housing between respective side-by-side contact segments.

4. An electrical switch system according to claim 1 in which the movable contact elements comprise elongated arms of electrically conductive spring material cantilever mounted on the insulative base member, the arms each having a free end forming an electrical contact.

5. An electrical switch system according to claim 1 in which the ledge is discontinuous in length.

6. An electrical switch system according to claim 1 in which the lip is generally arcuate having a center of curvature essentially coincident with the longitudinal axis.

7. An electrical switch system according to claim 1 in which the insulative base member is formed with another lip spaced from the first surface of the detent lever and extending in an inwardly, radial direction relative to the manual shaft and the housing is formed with another ledge spaced from the inner surface of the housing and extending in an outwardly, radial direction away from the manual shaft and received between the said another lip and the first face surface of the detent lever.

8. An electrical switch system according to claim 1 in which the coupling member extending from the vehicular transmission to the housing comprises a roller and further comprising first and second spaced apart, roller receiving, prongs formed on the housing.

9. An electrical switch system according to claim 1 further comprising a generally L configured leg extending from the periphery of the housing member diametrically opposite to the contact segments on the other side of the manual shaft with a portion of the leg facing the second face surface of the detent lever.

10. An electrical switch for use with a vehicular transmission comprising:
- a detent lever having opposed first and second generally planar face surfaces fixedly mounted on a manual shaft, the manual shaft having a longitudinal axis and being pivotable about the longitudinal axis,
- an electrically insulative base member mounted on the first face surface of the detent lever adapted for mounting movable electrical contacts thereon, the insulative base member movable along a first arcuate path,
- an electrically insulative housing member having a wall mounted on the manual shaft for pivotal movement about the manual shaft, the wall having an inner face surface facing the top surface of the insulative base member, a plurality of side-by-side arcuately shaped electrically conductive contact segments on the inner face surface facing the top surface of the insulative base member,
- movable electrical contacts mounted on the insulative base member and alignable and engageable with respective side-by-side contact segments,
- a lip formed along a peripheral edge of the insulative base member, and a ledge formed on the housing member and extending along a second arcuate path generally parallel to the first arcuate path and spaced from the inner face surface of the housing wall to form a control gap, the lip received in the control gap so that spacing between the movable contacts and the contact segments is maintained within a selected range during pivotal movement along the arcuate path of insulative base member.

11. An electrical switch system according to claim 10 in which the insulative base member has an inner and outer peripheral edge with respect to a radial direction relative to the longitudinal axis and the lip is formed on the outer edge.

12. An electrical switch system according to claim 10 in which the insulative base member has an inner and an outer edge with respect to a radial direction relative to the longitudinal axis and the lip is formed on the inner edge.

13. An electrical switch system according to claim 10 in which the insulative base member has an inner and an outer edge with respect to a radial direction relative to the longitudinal axis and the lip is formed on the inner and outer edge.

14. An electrical switch system according to claim 10 in which the movable contact elements comprise elongated arms of electrically conductive spring material cantilever mounted on the insulative base member, the arms each having a free end forming an electrical contact.

15. An electrical switch system according to claim 10 in which the ledge is discontinuous in length.

* * * * *